United States Patent [19]

Auger

[11] Patent Number: 4,684,865
[45] Date of Patent: Aug. 4, 1987

[54] METHOD AND DEVICE FOR CONTROLLING THE ACCELERATION OF AN ELECTRIC STEPPING MOTOR

[75] Inventor: Marc Auger, Marly la Ville, France

[73] Assignee: Centre Technique des Industries Mecaniques, Senlis, France

[21] Appl. No.: 842,810

[22] Filed: Mar. 21, 1986

[30] Foreign Application Priority Data

Mar. 25, 1985 [FR] France ............................... 85 04373

[51] Int. Cl.⁴ .............................................. H02P 8/00
[52] U.S. Cl. ..................................... 318/696; 318/685
[58] Field of Search ................................ 318/696, 685

[56] References Cited

U.S. PATENT DOCUMENTS

| | | | |
|---|---|---|---|
| 3,986,094 | 10/1976 | Quioque et al. | 318/696 |
| 4,268,783 | 5/1981 | Murray | 318/565 |
| 4,277,731 | 7/1981 | Pongracz | 318/685 |
| 4,489,260 | 12/1984 | Matsushita | 318/696 |
| 4,496,891 | 1/1985 | Kobayashi | 318/696 |

FOREIGN PATENT DOCUMENTS

| | | |
|---|---|---|
| 0116677 | 8/1984 | European Pat. Off. . |
| 3327906 | 9/1984 | Fed. Rep. of Germany . |
| 2512604 | 11/1983 | France . |

OTHER PUBLICATIONS

European Search Report, Appln. No. 0116677 (EP No. 83 10 6383) Apr. 27, 1984, The Hague.
IEEE 1982 Iecon Proceedings, 15-19 Nov. 1982, Palo Alto, CA. pp. 84-89, IEEE, New York, U.S. M. F. Rahman et al.
"Acceleration-Deceleration Capabilities of V.R. Type Steppers and Their High Performance Control Strategies on a Microprocessor Based CNC Controller".

*Primary Examiner*—William M. Shoop, Jr.
*Assistant Examiner*—Saul M. Bergmann
*Attorney, Agent, or Firm*—Stevens, Davis Miller & Mosher

[57] ABSTRACT

In order to attain the maximum permissible speed of a stepping motor and to achieve a substantial reduction in the time required to perform a predetermined number of steps, acceleration between the starting speed $V_o$ and the maximum speed $V_m$ takes place in the form of incremental increases $\Delta V_n$ in the frequency of the signal for controlling the speed of the motor at time intervals $\Delta t$ which are all equal. All the speeds $V_{n-1} + \Delta V_n$ are precomputed by a microprocessor and the precomputed values are stored in memory. These values are read at each instant $t + \Delta t$ during the acceleration period and in the reverse order with respect to the deceleration period. The curve velocity V is a function of time t is of exponential form with a negative exponent.

12 Claims, 11 Drawing Figures

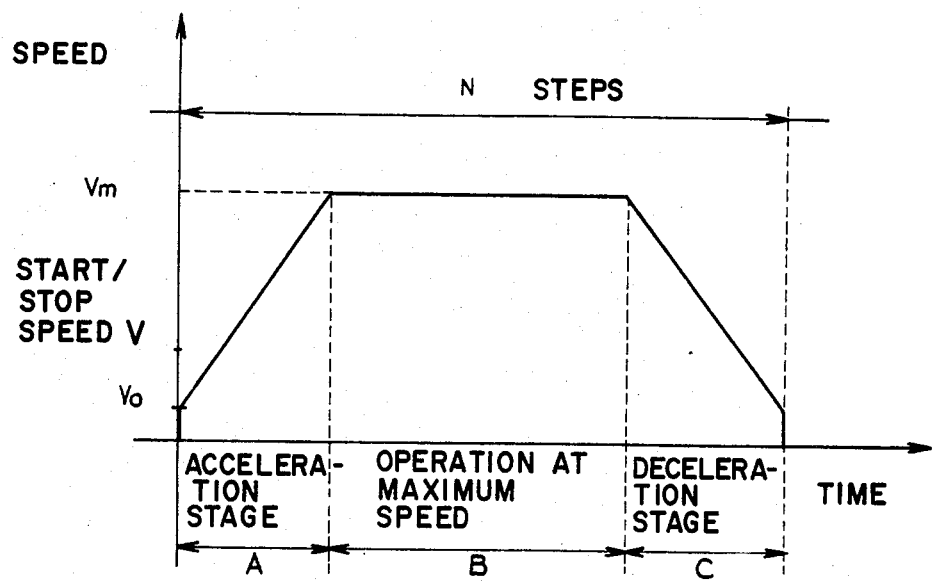
FIG_1
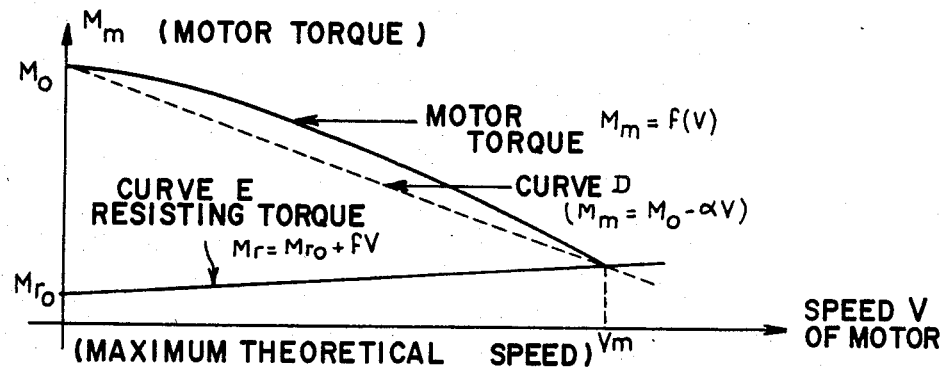
FIG_2
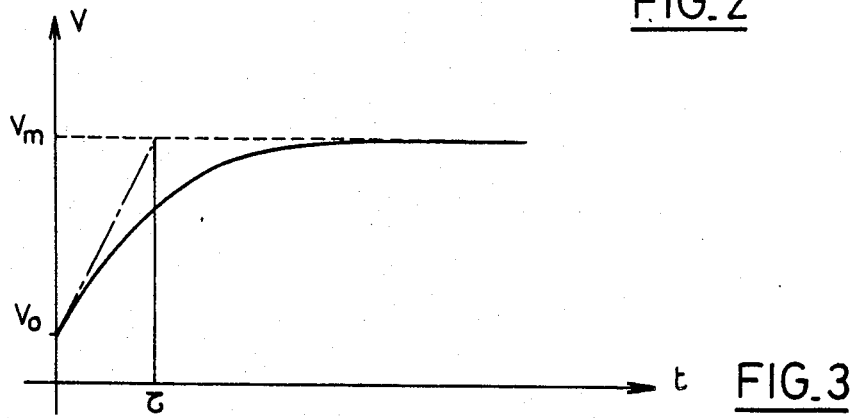
FIG_3

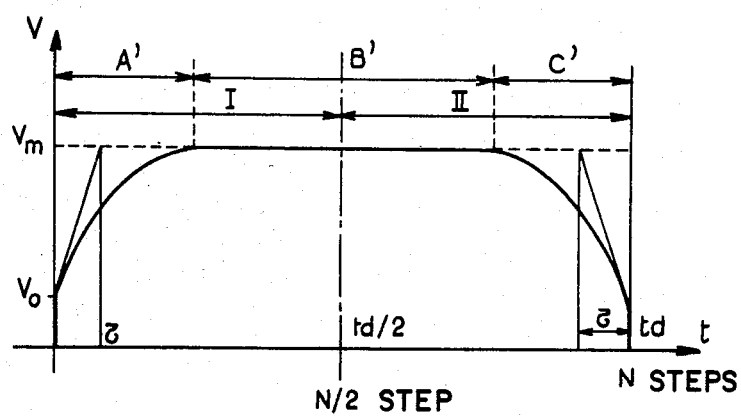
FIG_4
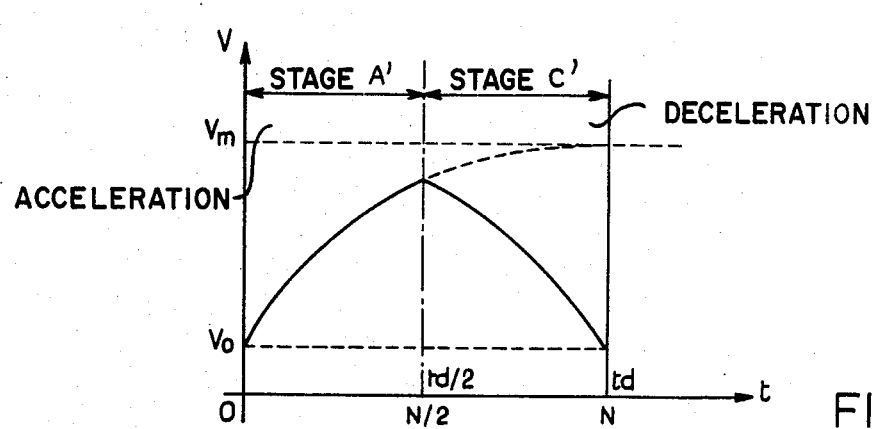
FIG_5
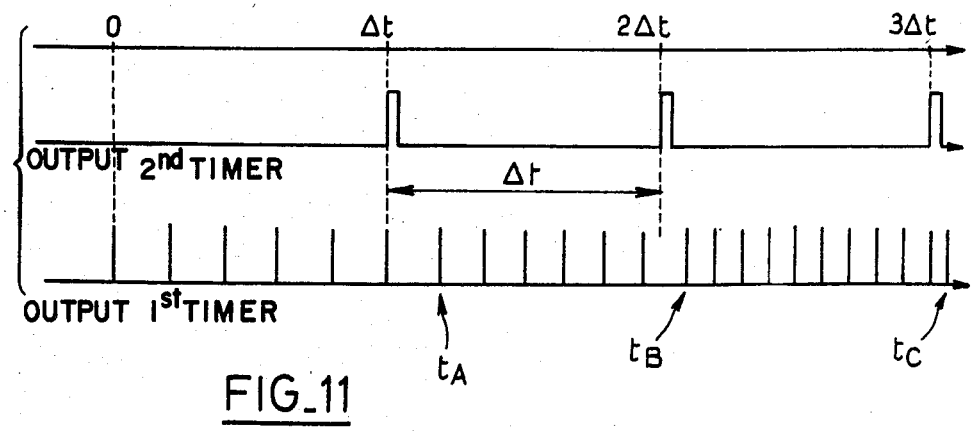
FIG_11

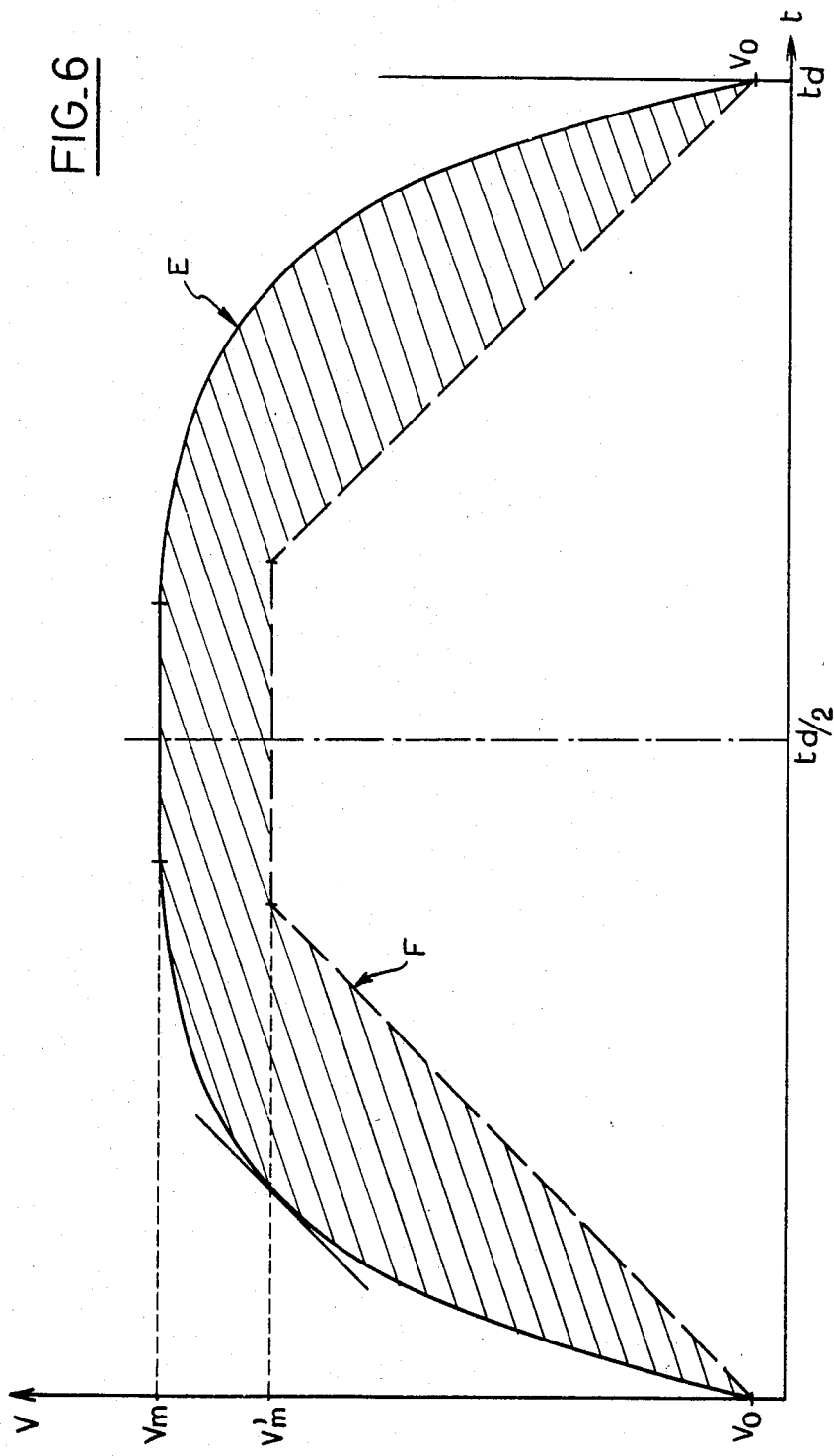

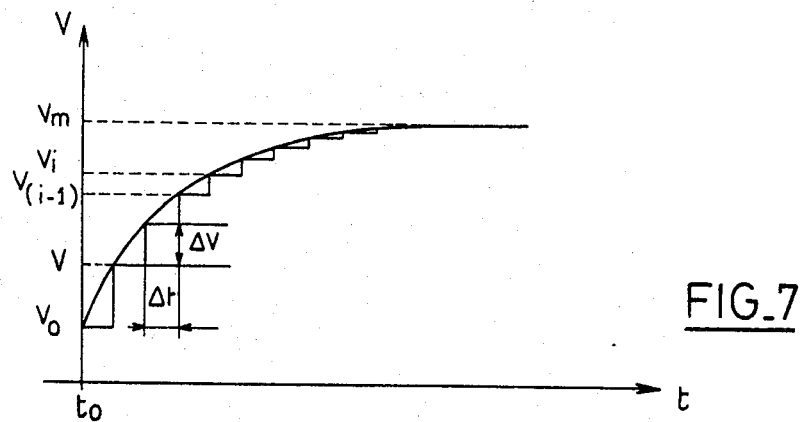
FIG_7
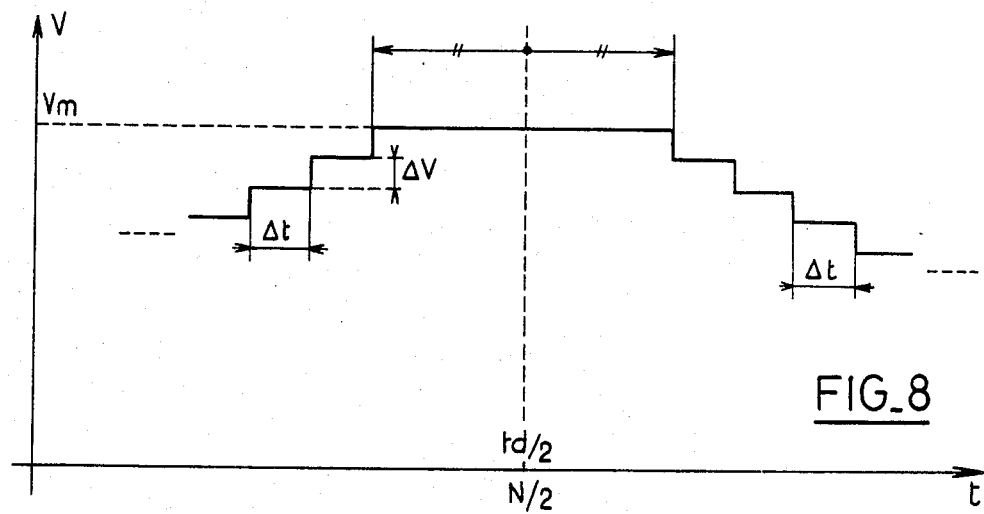
FIG_8
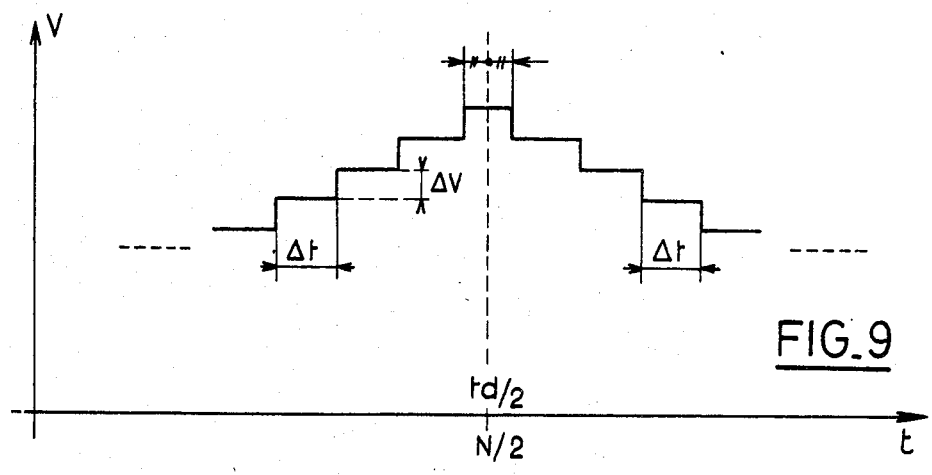
FIG_9

METHOD AND DEVICE FOR CONTROLLING THE ACCELERATION OF AN ELECTRIC STEPPING MOTOR

BACKGROUND OF THE INVENTION

The distinctive feature of an electric stepping motor lies in the fact that it rotates in an angular movement representing a fraction of a revolution or step, this movement being carried out with high precision both in value of angle and in direction under the action of a drive pulse.

For example, a complete revolution requiring two hundred pulses will produce a step of 1.8°. The number of steps per revolution depends on the number of phases of the motor, on its constructional arrangement and on the sequence of switching of the different phases.

The pulses are delivered to the system for controlling the motor windings in the form of a "frequency" signal, the frequency of which defines the speed of rotation in steps per second. A "direction" signal sets the switching of phases and therefore the direction of rotation of the motor.

When it is desired to start the motor from a zero initial velocity, if the control frequency at starting is too high, the motor is liable to start with a loss of step or may even not start at all. It is for this reason that a maximum starting frequency or so-called "start-stop" frequency has been defined.

The start-stop frequency is therefore the maximum frequency which permits starting and stopping without any loss of step. This frequency is a function of the motor itself but also of the inertia, of the resisting torque and of friction forces. Said frequency is therefore closely related to each particular use.

Stepping motors find applications in an increasingly wide range of different fields such as machine-tools, robotics, printing machines, drawing appliances, X-Y coordinate plotters, precision instruments for analysis or control.

In many of these applications, it is now desired to cause the stepping motor to carry out a given displacement in the shortest possible time. It is for this reason that, although it has been considered sufficient up to the present time and in the case of certain applications to operate the stepping motor at constant speed or in other words just below the start-stop speed defined earlier (usually substantially lower than 1000 steps per second, for example of the order of 300 steps per second in a given instance), it is now sought to accelerate the motor after startup to a speed which exceeds the start-stop value.

As will be readily apparent, a speed of rotation which is higher than the start-stop speed can be obtained after startup only by controlling the angular acceleration of the motor in order to prevent loss of synchronism. At each instant, the maximum angular acceleration which can be imparted to the motor is related to the driving torque, to the resisting torque and to the moment of inertia with respect to the drive shaft.

Attempts have therefore been made to develop control systems in which a given displacement is carried out automatically by the motor during a number N of steps over a minimum period of time.

A control operation under these conditions must be divided into three stages:

(a) starting at a speed below the start-stop speed followed by controlled acceleration to maximum speed;
(b) operation at maximum speed;
(c) controlled deceleration to a speed below the start-stop speed followed by stopping.

Rotation at speeds above the start-stop value permits a considerable reduction in times of positioning of a mechanism, particularly in the case of displacements of long duration. In fact, the maximum speed can be of the order of ten to twenty times higher than the start-stop speed (6000 to 7000 steps per second, for example).

In known types of control systems employed up to the present time, the law of speed increase from the starting speed $V_o$ to the maximum speed $V_m$ is linear in most cases in order to simplify the control. However, linear acceleration is quite obviously not an optimum law in regard to the motor characteristics (particularly in regard to the speed-torque characteristic of the motor) and does not permit optimum reduction of the time required for a given displacement.

It has also been proposed to adopt laws of speed increase in successive segments and in accordance with substantially parabolic or exponential curves. In all cases, however, the parameters of the law of speed increase (starting speed, maximum speed, time-duration of speed increase) cannot readily be programmed as a function of the particular conditions encountered. In consequence, the general practice consists in choosing a fixed value for these parameters and a fixed acceleration and deceleration program is introduced in a read-only memory (ROM) of the control system. In fact, programming very often entails the need for preliminary calculations and the programmed parameters are not independent with respect to each other. Finally, programming very frequently calls for other parameters which are directly related to the principle involved but do not directly characterize the movement to be performed.

Acceleration control systems are therefore attended by disadvantages either by reason of the fact that the acceleration curve is far from being of optimum shape or because the value of the various parameters to be taken into account is fixed or because the programming operation is both time-consuming and complicated while entailing the need for relatively powerful computing machines.

It is therefore difficult to obtain a minimum time-duration value for a given displacement of a mechanism with control systems of this type.

It has also been proposed in French Pat. No. 2,512,604, for example, to construct a stepping motor speed control device of the closed-loop type. In this case, however, it is necessary to provide a detecting element for producing synchronizing pulses which are representative of each incremental advance of the stepping motor.

The general objective of the present invention is to overcome the disadvantages of known systems of the first type described in the foregoing and to obtain optimum acceleration and deceleration curves without entailing the use of a detector device for producing synchronizing pulses as in the known systems of the second type described in the foregoing.

The system in accordance with the invention permits operation of the motor in accordance with an acceleration (and deceleration) curve of exponential shape having a negative exponent. As will hereinafter become apparent, this curve is the most favorable in the case of a stepping motor and permits simple processing of the different variable parameters to be introduced. This operation can be performed by means of a simple low-power microprocessor of a widely available 8-bit type, for example.

SUMMARY OF THE INVENTION

In the method provided by the invention, precalculation of the optimum velocity V in respect of each successive fraction $\Delta t$ of the acceleration time is carried out by the microprocessor prior to each starting of the motor. The successive values of V are stored in a random-access memory (RAM) in a predetermined order in order to be read in this order during the acceleration period, then in the reverse order during deceleration.

The device in accordance with the invention comprises, in addition to the conventional elements provided in known control systems, a first timer which delivers the control frequency to the motor and a second timer which delivers a signal having a period $\Delta t$, the reload value of the first timer being reupdated by the following speed value stored in the RAM memory at each overflow of the second counter, namely at intervals of $\Delta t$.

BRIEF DESCRIPTION OF THE DRAWINGS

Other features of the invention will be more apparent upon consideration of the following description and accompanying drawings, wherein:

FIG. 1 illustrates the three stages of operation of a motor (acceleration stage, maximum level stage and deceleration stage);

FIG. 2 represents the speed-torque characteristic of a stepping motor in which the torque is plotted as a function of the speed;

FIG. 3 represents the curve of optimum increase in speed;

FIG. 4 shows the shape of the speed curve during one complete displacement;

FIG. 5 shows the shape of the speed curve in the case in which the maximum speed $V_m$ is not reached in the time allowed;

FIG. 6 is a comparison of the curves $V=f(t)$ in the case of linear speed increase and exponential speed increase;

FIG. 7 illustrates the approach to the optimum exponential curve for a series of "stair-steps";

FIGS. 8 and 9 show the realization of time symmetry about the median instant td/2 of the operating time, respectively in the case in which the maximum speed $V_m$ can be attained and in the case in which it cannot be attained;

FIG. 11 is a representation of the signals at the output of the first and second counters.

DETAILED DESCRIPTION OF THE INVENTION

Figure 10:
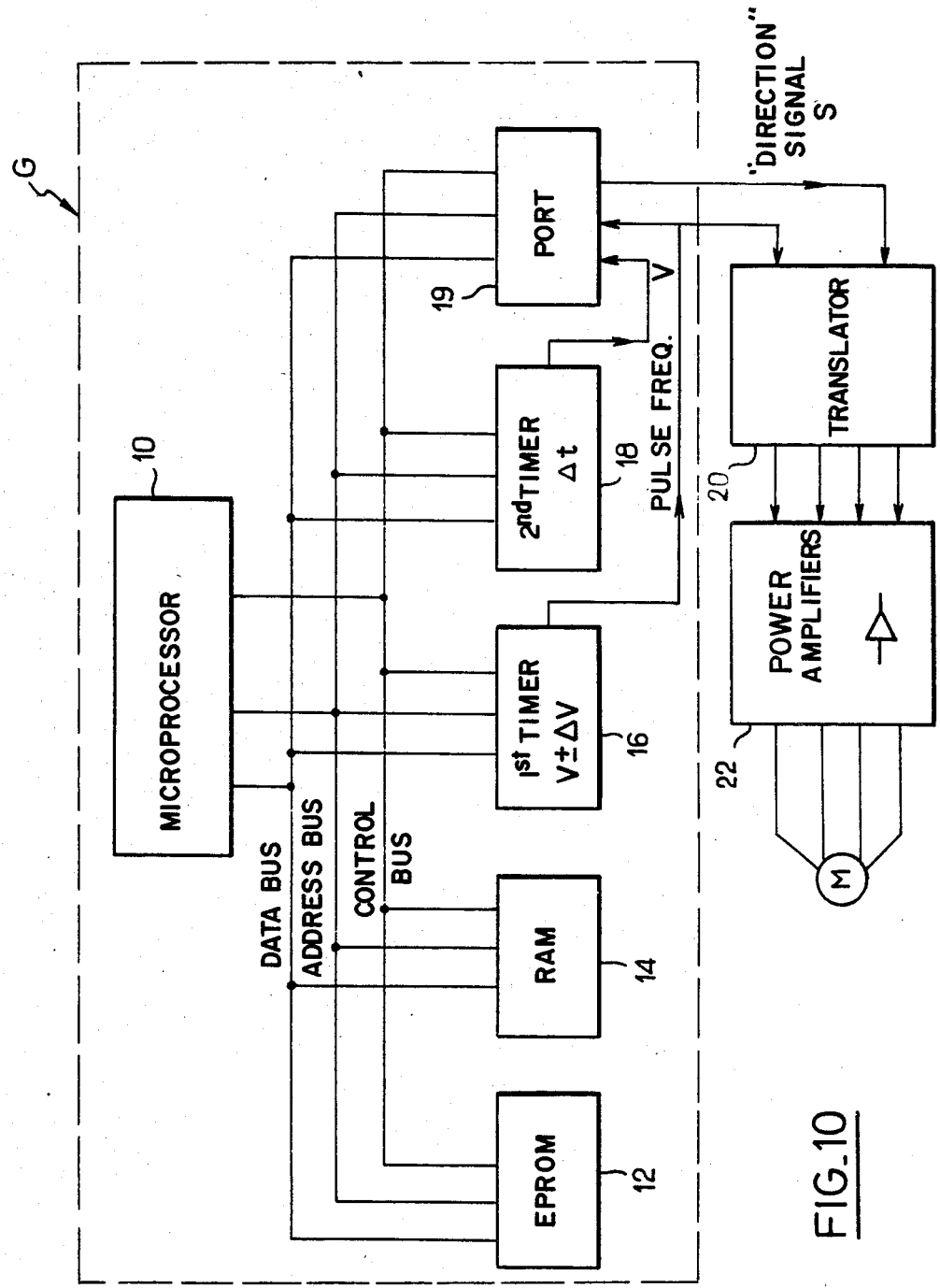
FIG. 10 is a diagram of the different elements of an acceleration generator in accordance with the invention.

The three stages of operation of a stepping motor in the case of a displacement corresponding to N steps are represented in the diagram of FIG. 1 by a characteristic curve of speed as a function of time.

Stage A is the starting and acceleration stage, starting being carried out at a speed $V_o$ which is lower than the start-stop speed.

Stage B is the stage of steady-level operation at the maximum permissible speed $V_m$. Stage C is the deceleration and stopping stage which is symmetrical with stage A. For the sake of enhanced clarity, FIG. 1 simply shows the law of speed increase in linear form which is not the most favorable.

FIG. 2 in fact represents the torque developed by a stepping motor as herein described and plotted against speed as shown by the full-line curve which can be compared with a straight line D (shown as a dashed line in FIG. 2) corresponding to the equation:

$$Mm = Mo - \alpha V$$

where
Mm is the drive torque at a velocity V,
Mo is the starting torque,
$\alpha$ is the slope of the straight line D.

Accordingly, it is possible on this basis to determine the ideal curve of speed increase which makes it possible to apply the maximum speed to the motor at each instant of the acceleration stage. This speed increase is of exponential form with a negative exponent, in which the velocity V as a function of time is: $V = V_m(1 - e^{-t/\zeta})$, where $\zeta$ is the speed-increase time constant which is dependent on the maximum inertia of the motor/load assembly, on the slope $\alpha$ of the curve D (FIG. 2), on the motor torque Mo in respect of V=0, on the resisting torque Mro in respect of V=o (FIG. 2) developed at the drive shaft of the motor, on the slope F of the curve E (coefficient of viscous friction).

Since the motor starts directly at a speed $V_o$ of lower value than or equal to the start-stop speed, the speed-increase curve is therefore expressed as follows:

$$V = V_o + (V_m - V_o)(1 - e^{-t/\zeta})$$

in accordance with the diagram of FIG. 3.

In the case of a complete displacement (rotation through N steps), the curve of speeds as a function of time is represented in FIG. 4. There are again shown in this figure the three stages of operation (A': starting and acceleration; B': steady-level stage at the maximum speed $V_m$; C': deceleration and stopping) which are similar to the three stages A, B, C of FIG. 1. It should be noted that the curve is symmetrical with respect to the instant td/2 (corresponding to N/2 step), where td is the total time-duration of the movement.

In the event that the number of steps N is not sufficient to attain the maximum speed $V_m$, the curve velocity V of a function of time 7 will have the shape which is illustrated in FIG. 5.

The law of speed increase of exponential form with a negative exponent which has been defined in the foregoing and compensates for reduction in torque of stepping motors as a function of speed is the most favorable form for producing a given displacement within a minimum time interval.

This is clearly illustrated in FIG. 6 in which the full-line curve E represents the speed characteristic (similar to FIG. 4) in the case of a displacement during a time interval $t_d$ and in which the dashed-line curve F represents the speed characteristic (similar to FIG. 1) with a linear acceleration and deceleration law during the same time interval $t_d$.

It is clearly apparent from FIG. 6 that, during the acceleration and deceleration stages, the speed is always higher in the case of the curve E. It is further apparent that the maximum speed $V_m$ cannot be attained with the curve F since the steady-level speed is limited to a value $V'_m$ which is substantially lower than $V_m$. The result thereby achieved is that, during a given time interval $t_d$, the number of steps performed by a motor controlled in accordance with curve E is considerably greater than the number of steps performed by a motor controlled in accordance with curve F (the difference being illustrated schematically by the hatched area located between the two curves). Although it is apparent from FIG. 6 that the curves E and F correspond to the same operating time $t_d$ for the sake of simplification, it remains wholly apparent that, in order to complete the same number N of steps, the time-duration will be much shorter in curve E than in curve F. The gain in displacement time can be of the order of 30 to 50% in accordance with the invention.

In order to permit calculation of the operating curve by the microprocessor, two stages of operation on each side of td/2 or in other words on each side of N/2 as shown in FIG. 4 are defined as follows:
Stage I: acceleration
Stage II: deceleration
These two stages correspond to Stages A' and C' in FIG. 5.

Since Stage II is symmetrical with Stage I with respect to the median point of the movement, it is only necessary to define the computation algorithm for the law of speed increase in Stage I.

In Stage I: $V = V_o + (V_m - V_o)(1 - e^{-t/\zeta})$ it is shown that:

$$\frac{dV}{dt} = \frac{V_m - V}{\zeta} \rightarrow \boxed{\Delta V = \frac{\Delta t}{\zeta}(V_m - V)} \quad (1)$$

If the curve V=f(t) is approached by a series of stair-steps having a width $\Delta t$ as shown in FIG. 7 which illustrates expression (1) given above, calculation of the exponential is reduced to a calculation of intervals $\Delta V$ which make use of simple arithmetical operations. This calculation ca be reduced even further if $\Delta t$ is chosen so that:

$$\Delta t = \frac{\zeta}{2^k}$$

whence $$\Delta V = \frac{(V_m - V)}{2^k}$$

The approach to the theoretical curve is finer as k is of higher value.

Let $V_{(i-1)}$ be the speed (velocity) at the instant $$t_{(i-1)} = t_o + \sum_{n=i}^{n=i-1} \Delta t_n$$

and let $V_{(i-1)}$ be the speed (velocity) at the instant $$t_i = t_o + \sum_{n=1}^{n=i} \Delta t_n$$

-continued $$\boxed{V_i = V_{(i-1)} + \Delta V_i}$$

with $$\Delta V_i = \frac{V_m - V_i}{2^k}$$

Furthermore, the microprocessor will produce time symmetry about the mid-point of the movement as illustrated in FIG. 8 in the case in which the maximum speed $V_m$ is attained (as is also the case in FIGS. 4 and 6) and in FIG. 9 in the case in which the maximum speed $V_m$ cannot be attained in the time available (as is also the case in FIG. 5).

It is clear that, by means of the aforementioned algorithm which makes use of only simple arithmetical operations (addition, subtraction, shifting) which can be performed very readily and rapidly, a microprocessor of simple design makes it possible to compute, in respect of each $\Delta t$, the new speed Vi for producing the maximum angular acceleration which can be given to the motor at the instant considered, that is to say an exponential acceleration which is ideal for a stepping motor.

In view of the simplicity and speed of computation, it is possible to choose a relatively high degree of fineness of elementary time intervals $\Delta t$ (for example approximately 1/50 to 1/500 of the acceleration period), thus providing a very good approach to the ideal curve.

The programmable acceleration generator G in accordance with the invention comprises a microprocessor 10 (as shown in FIG. 10) which can be a simple 8-bit unit of a currently available type or even an 8-bit "microcontroller", a nonvolatile or read-only memory (ROM) 12 which contains the computation program, and a random-access memory (RAM) 14 which contains the temporary data and the instructions.

The only parameters to be introduced by the user in the case of a given mechanism are as follows:
$V_o$=starting speed,
$V_m$=maximum speed (or steady-level speed),
$\zeta$=time constant of the speed increase to which there should clearly be added, in respect of each displacement, the parameter N=total number of steps to be performed, and S=direction of motion.

The generator G further comprises a first automatic-reloading timer 16 which delivers, during each period $\Delta t$, the computed frequency V of motor control operations at this moment (for example from 300 steps per second at the speed Vo up to 5000 or 7000 steps per second at the speed $V_m$). In addition, said generator comprises a second automatic-reloading timer 18 which delivers the signal having a period $\Delta t$ which is constant throughout the duration of acceleration. The signals delivered by the two timers are illustrated in FIG. 11 which shows the increase in frequency of the frequency signal at each period $\Delta t$.

The reload value of the first timer is modified by a value $\Delta V$ at each overflow of the second timer and therefore at uniform intervals corresponding to $\Delta t$.

The "frequency" signal V which defines the speed of rotation of the motor in steps per second and the "direction" signal S which issues from the port 19 and determines the direction of rotation of the motor are transmitted to a translator circuit 20 which generates the sequence of switching of the different stages as a function of the desired direction of rotation and as a function of the previous switchover in accordance with customary practice in the control of stepping motors, the pulses being applied to a power amplifier 22 which supplies the motor M.

The microprocessor 10 has the function of counting the pulses delivered to the translator 20, of determining the operating zone or point on the curve (acceleration, steady level, midpoint of motion, deceleration, stopping) and also of loading the first timer 16 at the new value $V \pm \Delta V$ at uniform intervals of $\Delta t$.

As represented by the time intervals $t_A$, $t_B$, $t_C$ on the graph of FIG. 11 showing the output signals of the second timer, it is worthy of note that the changes in speed from a given value V to a higher value $V + \Delta V$ which is next in sequence take place only in a whole number of periods of the speed signal, namely when the first pulse appears at the new frequency after the corresponding frequency-change signal.

In the case of the acceleration generator in accordance with the invention, which it is desired to utilize as a means for obtaining the maximum speeds permitted by the exponential curve, real-time computation of the values loaded into the first timer 16 would prevent the possibility of attaining these maximum speeds. In point of fact, the performance time between two steps must at any moment be shorter than the period of the "frequency" signal.

It is for this reason that, in accordance with the invention, the different values of speed utilized during the acceleration stage are precomputed (on the basis of the algorithm described earlier) prior to commencement of motion, then stored in a table in a RAM storage area. It is then only necessary for the microprocessor to read each value in succession in the table during an acceleration stage. During a deceleration stage, reading of the table is performed in the opposite direction.

In consequence, each time a change is made in at least one of the two parameters $V_o$ and $V_m$, the microprocessor 10 performs prior to commencement of each movement a precomputation of the different speed values employed during the acceleration stage. By means of the hereinbefore described algorithm which makes use of only simple arithmetic operations, this precomputation can be carried out in a very short time interval of less than 10 ms (8 ms, for example) with an inexpensive low-power microprocessor. This short time-lag can even permit systematic precomputation prior to commencement of each movemen and is amply compensated by the fact that both acceleration and deceleration are carried out in accordance with an optimum curve as well as by the fact that steady-level operation (when it exists) takes place at the highest possible speed. In respect of a given displacement and a given mechanism, the generator in accordance with the invention permits a saving of time of 30 to 50% with respect to known acceleration systems which utilize a linear acceleration curve and/or which perform real-time computation of the different speed values.

It will readily be apparent that the invention is not limited to the distinctive features which have been more particularly described in the foregoing. It accordingly follows that, although an acceleration curve of exponential form having a negative exponent is the most favorable from the value $V_o$ up to the value $V_m$, it would not constitute any departure from the scope of the invention to employ such a curve only in part of the acceleration stage, particularly the final portion of said stage, thus making it possible to attain the highest speed values without any attendant danger of tripping of the motor.

Similarly, it would be feasible to adopt a curve which is different from the ideal exponential curve (for example a portion of sinusoid or of hyperbola) on condition that, at least in the final portion of the acceleration stage, each speed increase $\Delta V_n$ is smaller than the increase $\Delta V_{n-1}$ corresponding to the preceding time interval $\Delta t_{n-1}$.

Finally, if precomputation of all the speed values $V_{n-1} + \Delta V_n$ can be performed before each startup of the motor, it may prove advantageous to carry out this precomputation prior to starting of the motor only in the event that at least one of the characteristic parameters of the curve velocity V is a function of time t has changed. If there is no change in these parameters, the values already stored in memory are utilized directly. This achieves a saving of the time otherwise required for precomputation.

What is claimed Is:

1. A method for controlling the acceleration of an electric stepping motor between a starting speed $V_o$ and a maximum value $V_m$ in incremental increases $\Delta V_n$ of the motor control pulse frequency, wherein said method comprises the steps of:

dividing the acceleration time into a predetermined number of equal periods $\Delta t$ each representing a fraction of said acceleration time;

computing beforehand by means of a microprocessor all the speed values $(V_{n-1} + \Delta V_n)$ corresponding to each period $\Delta t$, $\Delta V_n$ is smaller than the increase $\Delta V_{n-1}$ of the immediately proceeding period $\Delta t$ during at least the final portion of the acceleration phase;

storing in a RAM memory data representative of values which have thus been precomputed;

producing a signal having a period $\Delta t$ which is applied to the microprocessor so that the precomputed values $(V_{n-1} + \Delta V_n)$ stored in memory should be read successively by said microprocessor at each interval $\Delta t$; and transmitting during each period said values $(V_{n-1} + \Delta V_n)$ in the form of a pulse frequency to the system for controlling the motor windings.

2. A method according to claim 1, wherein precomputation is preformed by the microprocessor and the precomputed values are stored in memory after each change of at least one parameter which characterizes the shape of the curve velocity as a function of time and prior to starting of the motor.

3. A method according to claim 1, wherein the microprocessor computes each speed increase $\Delta V_n$ with respect to the preceding speed $V_n$ on the basis of the formula $$\frac{V_m - V_n}{2^k},$$

where k is a fixed coefficient which determines the fraction of the acceleration time represented by $\Delta t$ and said acceleration curve is of exponential shape.

4. A method according to claim 3, wherein the period $\Delta t$ corresponds to a fraction chosen between 1/50 and 1/500 of the acceleration time.

5. A method according to claim 4, wherein the number of periods $\Delta t$ in the acceleration time is chosen so as to ensure the precomputation can be performed by the microprocessor in a time interval of the order of 10 ms.

6. A method according to claim 1 for controlling acceleration and then deceleration of a motor, wherein, during the decleration period, the precomputed values $(V_{n-1} + \Delta V_n)$ stored in memory are read in the reverse order with respect to the reading operation performed during the acceleration period.

7. A programmable acceleration generator for controlling the speed of an electric stepping motor, said motor including a switching and amplifying means for producing angular motor movements in incremental steps, said generator comprising:

programmable microprocessor computation means for generating a pulse frequency V which serves to control said switching and amplifying means, and for periodically changing the pulse frequency V by a value $\Delta V$ in a period $\Delta t$, wherein a series of values which can be assumed by the pulse frequency V is precomputed by said computation means, where V is a function of time;

random access memory (RAM) means for storing said precomputed values in a given order;

a first timer means for delivering the pulse frequency V to said switching and amplifying means;

a second timer for delivering a signal having a period $\Delta t$, said first timer means being modified by said computation means at the end of each period $\Delta t$, said series of values precomputed by said computation means being read from said RAM means in order during an acceleration stage and being read in a reverse order during a deceleration stage.

8. A generator according to claim 7, wherein said computation means further includes means for performing a further computation of the values V prior to starting of the motor if at least one of the parameters of the curve velocity as a function of time has changed.

9. A generator according to claim 8, wherein the series of values which can be assumed by the pulse frequency V is such that the difference in frequency $\Delta V_n$ between two consecutive frequency values decreases during the acceleration stage and increases during the deceleration stage.

10. A generator according to claim 9, wherein the series of values which can be assumed by the pulse frequency V is such that the difference $\Delta V_n$ between two consecutive frequency values is proportional to the difference between a desired maximum frequency $V_m$ and a lowest frequency $V_o$ of said consecutive frequencies.

11. A generator according to claim 10, wherein at least the parameters comprising the total number N of steps to be performed, the starting speed $V_o$, the maximum speed $V_m$ and the time-duration of speed increase are determined by the user and introduced into the computing means.

12. A generator according to claim 11, wherein each change in pulse frequency V takes place only in a whole number of periods of said signal.

* * * * *